April 18, 1961  V. H. HASSELQUIST  2,979,978
BIAS CUTTER CONVEYOR CONTROL COMPRISING
LINKAGE MEANS TO MAINTAIN DISTANCE
BETWEEN CUTTER AND STOP Filed Aug. 5, 1958  8 Sheets-Sheet 1

FIG. 1

INVENTOR.
VICTOR H. HASSELQUIST
BY C. E. Tripp
ATTY.

FIG. 2a

INVENTOR.
VICTOR H. HASSELQUIST
BY C. E. Tripp
ATTY.

Fig. 4

INVENTOR.
VICTOR H. HASSELQUIST
BY C. E. Tripp
ATTY.

United States Patent Office 2,979,978
Patented Apr. 18, 1961

2,979,978

BIAS CUTTER CONVEYOR CONTROL COMPRISING LINKAGE MEANS TO MAINTAIN DISTANCE BETWEEN CUTTER AND STOP

Victor H. Hasselquist, Akron, Ohio, assignor to The B. F. Goodrich Company, New York, N.Y., a corporation of New York Filed Aug. 5, 1958, Ser. No. 753,274

4 Claims. (Cl. 83—209)

This invention relates to bias cutting rubberized fabric such as tire cord fabric.

More particularly, the invention relates to mechanism associated with a bias cutter for controlling the feed of the bias cut conveyor so that a predetermined width of ply stock is severed. The width referred to is the width of the severed ply length as measured perpendicularly to the severed edges of the length. It is a feature of this invention that once the desired width of severed stock is set into the machine this width is maintained regardless of changes in the bias cut angle of the bias cutter. Another feature of this invention resides in the nature of the sensing means that control the feed of the bias cutter conveyor. The preferred embodiment of the invention employs sensing means that extend upwardly through a slot in the belt supporting table of the bias cutter conveyor in such a manner as to not interfere with the operation of an automatic ply length transfer device such as that described and claimed in my copending application entitled "Automatic Alignment of Bias Cut Stock," S.N. 753,343, filed August 5, 1958. The sensing means employed includes a pair of pivotally mounted fingers that open electrical contacts when engaged by the leading end of the advancing cord stock, which fingers can pivot beneath and clear of the conveyor belt table if they offer any obstruction to motion of the ply length transfer device along the conveyor belt.

The sensing means is mounted on a carriage that runs on a track underneath the upper conveyor table and parallel to the motion of the conveyor belts. The carriage is pivoted to a base plate at the axis of the sensing finger that stops the conveyor drive. The base plate is slidably mounted on rods that move along the conveyor in response to the width adjustment. As will be seen from the following description of a preferred embodiment of the invention, the arrangement is such that the pre-set width adjustment of the stop finger remains unchanged as the angle of the bias cutter relative to the bias cutter conveyor is altered.

Figure 1:
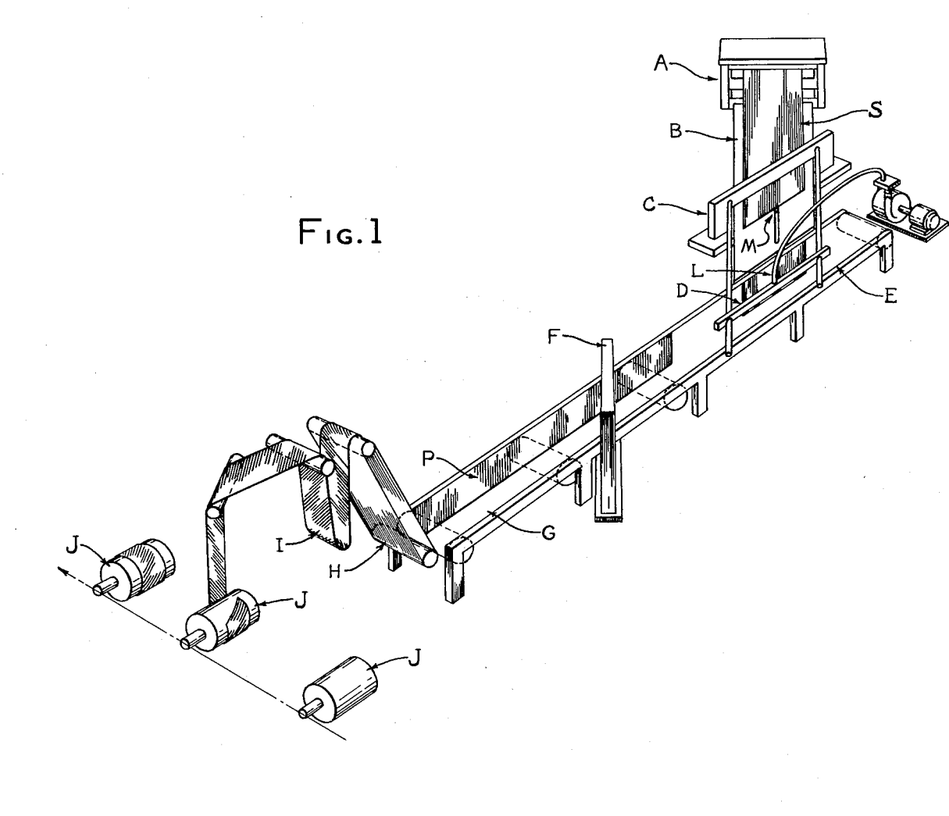
Fig. 1 is a diagram of a stock supply system embodying the invention.

Referring to Fig. 1, the system embodying the invention includes a fabric strip let-off and festooner assembly A which supplies a strip of rubberized fabric cords S to a bias cutter conveyor B. The bias cutter C operates to cut lengths of bias cut stock L from the main strip. A vacuum box D transfers the bias cut strips from the bias cutter conveyor B to a butt splicer feed conveyor E. This conveyor is actuated by suitable controls to feed the length of stock L to a butt splicer F which combines the lengths into a single strip P of bias cut stock. This length of stock is carried away from the bias cutter by a conveyor G and a festooner conveyor H, the arrangement being such as to provide a loop or festoon I of the stock so that it can be intermittently fed and applied to the tire building drum J.

Referring to Figs. 2–5, the bias cutter conveyor B is made up of a series of belts 10 that pass over end pulleys 11 disposed at the feed conveyor E. The conveyor is supported on a frame including legs 12 and an upper base plate or table 13 and the bias cutter is pivotally supported on the frame by means of a carriage 14. The mounting is such that the bias cutter pivots about an axis 15 at the center of the conveyor B and can be clamped at the desired bias angle. These devices are well known in the tire building art.

Figures 2, 3:
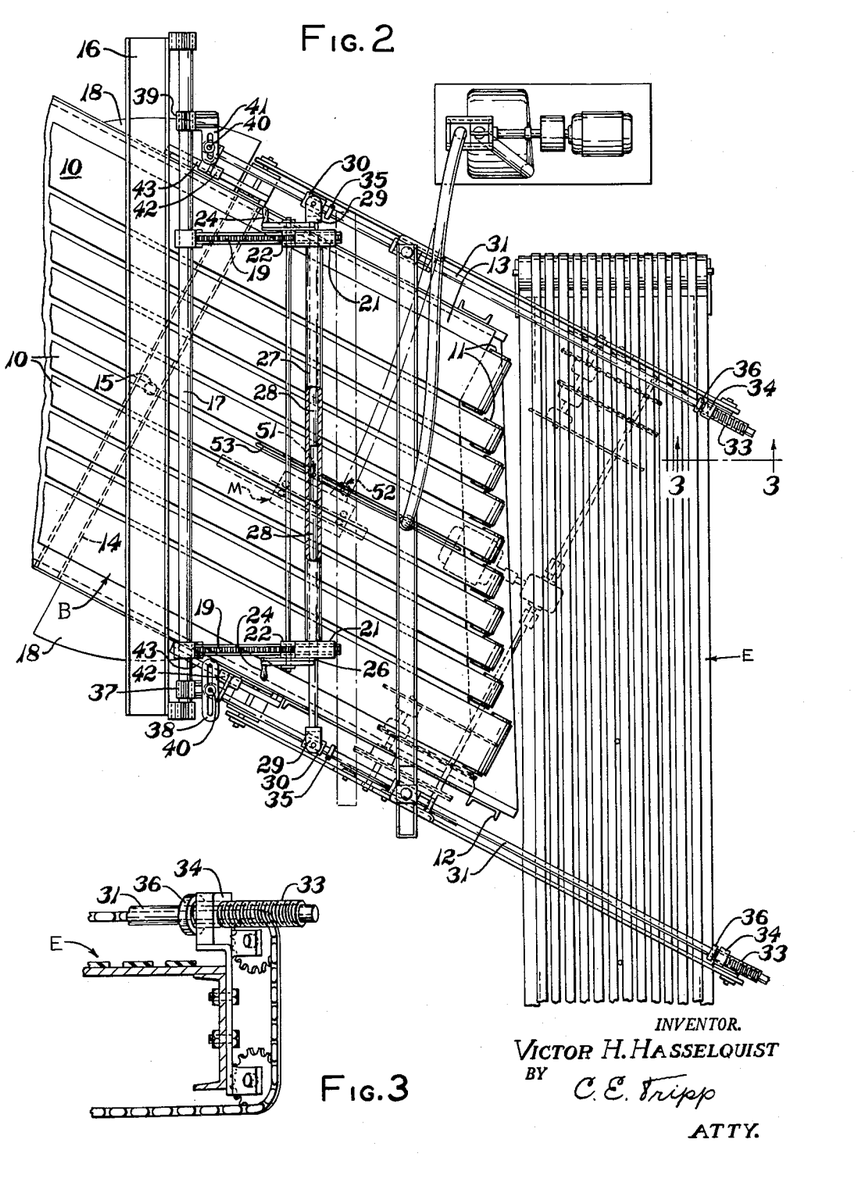
Fig. 2 is a plan view at the bias cutter.
Fig. 3 is a fragmentary elevation of the right-hand end of the vacuum box carrier taken on line 3—3 of Fig. 2.
Figure 2A:
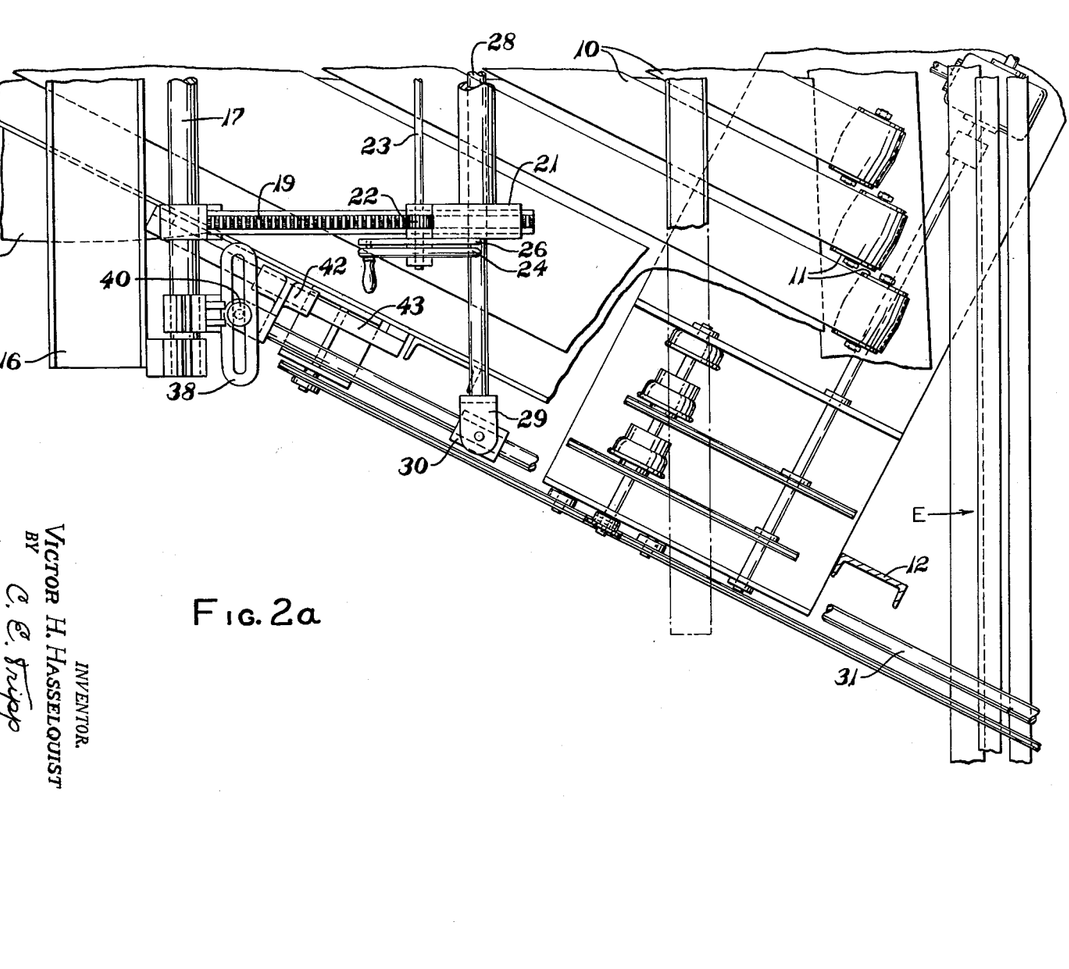
Fig. 2a is an enlarged plan view of one side of Fig. 2.
Figure 4:
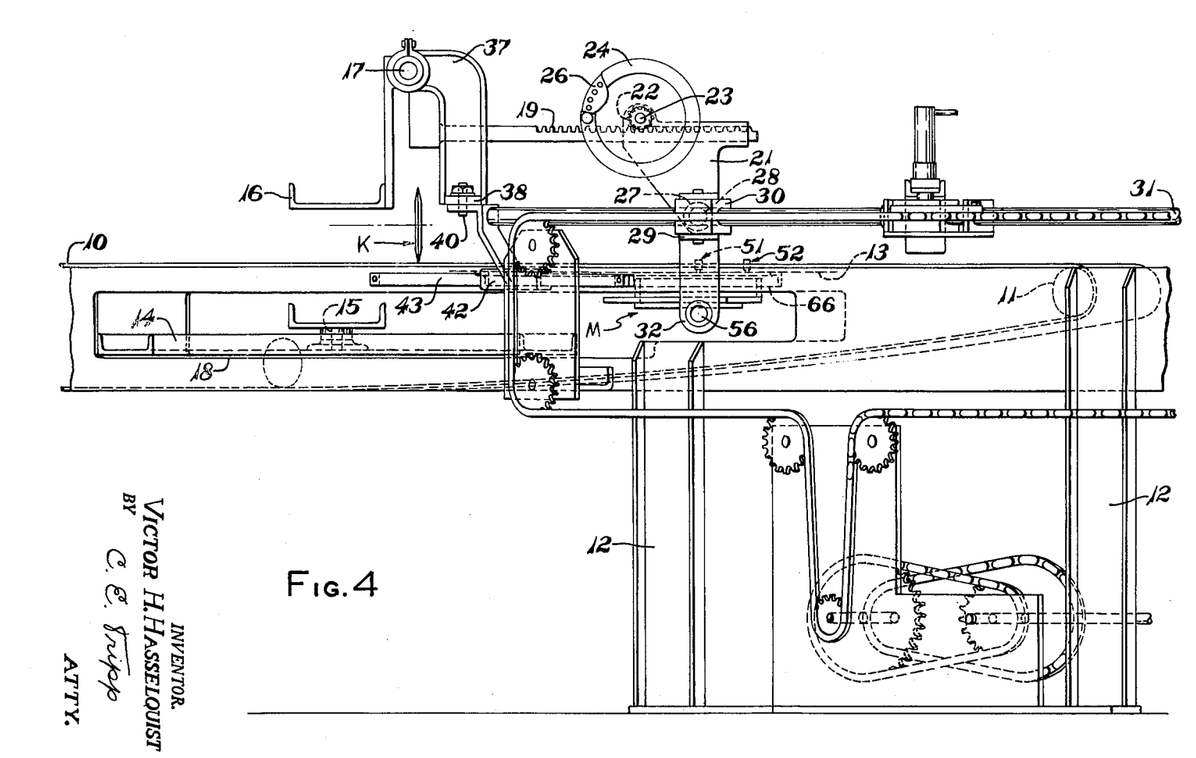
Fig. 4 is a side view of the apparatus.

The bias cutter includes a cross-support channel 16 that mounts a knife bar 17 which carries a rotatable knife that is moved from one side of the conveyor to the other to cut the stock. The knife is indicated diagrammatically at K in Fig. 4 but the drive and support for the knife is not shown for the reasons explained. The plate 18 appearing in Fig. 2 represents the arcuate indexing plate for the assembly.

Means are provided for adjusting the width of the plies L cut from the main strip, which width is measured perpendicular to the cut edges of the stock. A pair of width adjusting support racks 19 extend from the bias cutter knife bar 17 and slidably mounted on each rack is a carriage 21 that has a pinion 22 engaging the rack, the pinions being connected by a cross shaft 23. A hand crank 24 turns the shaft and pinions and thus moves the carriages in parallel paths. An index plate 26 is provided to maintain the crank at its desired position. The carriages are also supported on a cross tube 27 in which slide a pair of rods 28. The outer ends of the rods have clevises 29 that are pivoted on sliding stop blocks 30 that slide on a pair of guide rails 31. The stop blocks have depending arms 32 that mount cross members that extend under the upper reach of belts 10 and carry the adjustable sensing means for controlling the feed of conveyor B that forms part of this invention.

The guide rails 31 are slidably mounted at the far side of the feed conveyor E in bushings 33 mounted on suitable supports 34. Each bushing contains a threaded stop collar 36 that limits motion of the vacuum box D at one end of its travel. To support the other end of the guide rails, the bias cutter has a bracket 37 and has a depending arm mounting a slotted plate 38, the other end has a similar bracket 39 mounting a slotted plate 41. The slotted plates engage pins 40 on flanges at the end of the guide rails. The flanges at the bias cutter ends of each guide rail are fixed to a carriage 42 that slides on bars 43. The purpose of this assembly is to insure that the ends of the guide rails do not interfere with the travel of the bias cutting knife at various adjusted bias angles.

The vacuum box D transfers lengths L of bias cut stock from the bias cutter conveyor B to the butt splicer feed conveyor E, as described and claimed in my copending application, S.N. 753,343, filed August 5, 1958.

The drive for the belts 10 of the bias cutter conveyor B is by means of an electric motor and suitable controls including means for starting the conveyor at a relatively fast speed, reducing it to a so-called "creep" speed near the end of the cycle, and stopping and braking the drive when the desired width of stock has been fed under the bias cutter knife bar. Such a drive is known in the art and is not illustrated, because the details of the drive proper form no part of this invention.

It has been customary to control the conveyor belt drive by a pair of photo-electric cell units arranged so that the stock interrupts the light beams successively to first slow down and then stop the conveyor drive. Such a control unit would be interfered with by the travelling stock pick up bar D forming the subject matter of my aforesaid copending application and it is a feature of this invention that the sensing or control means includes a pair of fingers 51 and 52 that extend upwardly through a slot 53 in the conveyor table, which fingers break contacts when engaged by the stock and are mounted to swing clear, flush with the table as the stock passes over them.

Figures 6, 7:
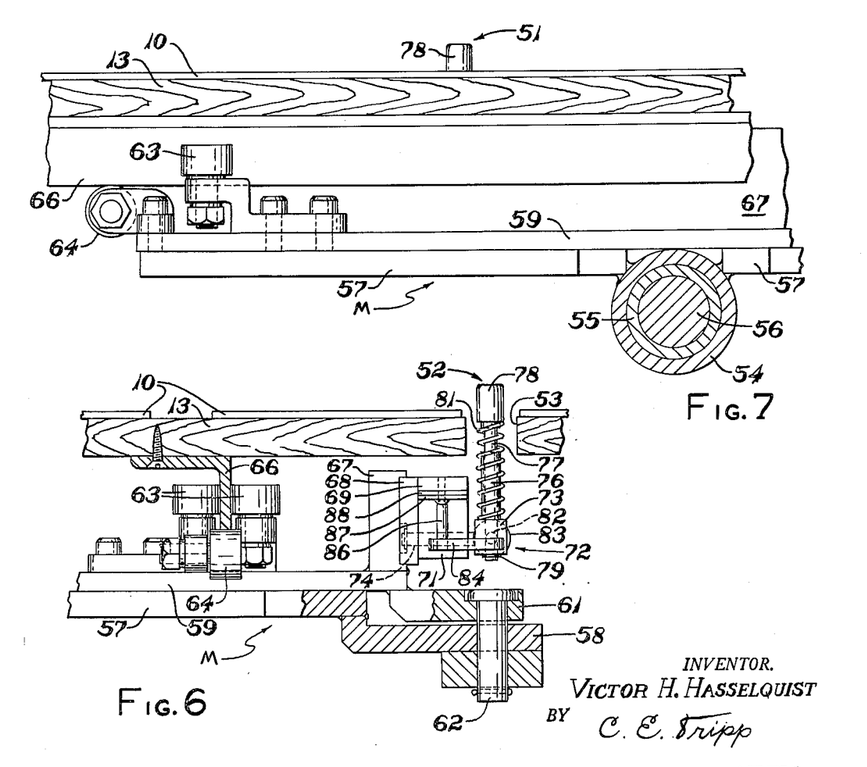
Fig. 6 is an end view thereof.
Fig. 7 is a side view thereof taken on 7—7 of Fig. 5.

The aforesaid fingers are mounted on a carriage assembly M disposed underneath the table 13, the carriage assembly being mounted on a cross tube 54 as seen in Figs. 6–11. The cross tube has bushings 55 that slide on a pair of rods 56 which rods extend inwardly from the depending arms 32 previously described. The carriage assembly includes a base plate 57 welded to tube 54 as best seen in Fig. 7, and an ear 58 extends from one side of the carriage for mounting a swivel plate 59. The swivel plate has an ear 61 that overlies a base plate ear 58 and the ears are pivoted together by a vertical pivot pin 62, it being important that the axis of this pin substantially coincides with the stop control finger 52.

Figure 5:
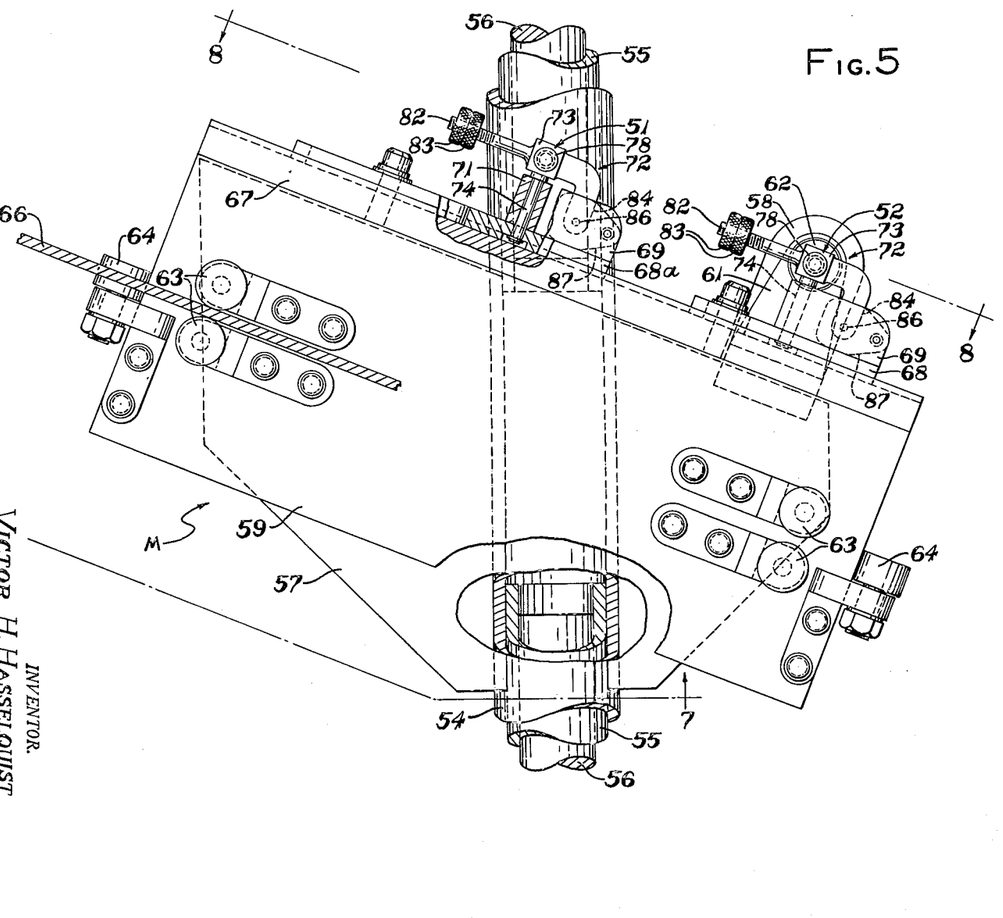
Fig. 5 is a plan view of the sensing device mounting.

The carriage assembly can slide along the conveyor belt table in the direction of the belt travel, being guided by horizontal guide rolls 63 and vertical guide rolls 64 that engage a depending track 66, as best seen in Figs. 5 and 6.

Figure 8:
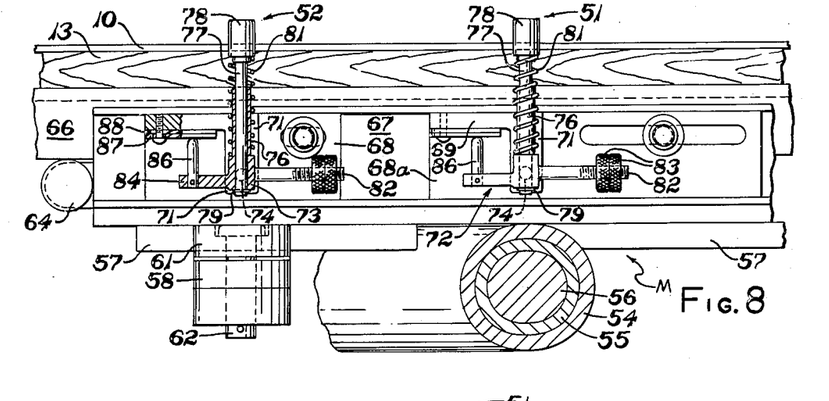
Fig. 8 is a side view thereof taken on 8—8 of Fig. 5.

The sensing fingers are mounted on an upstanding flange 67 attached to swivel plate 59, and adjustably mounted base plates 68 and 68a are provided for mounting the fingers. Welded to each base plate is an angle plate 69 best seen in Fig. 8 having a depending flange portion 71 for pivotally mounting the associated finger assemblies. The finger assemblies, indicated generally at 72, include a block 73 from which extends a horizontal pivot shaft 74 that is perpendicular to the slot 53 in the table. This shaft is rotatably mounted in the depending flange 71 of angle plate 69 as best seen in Fig. 5. The block 73 also carries an upstanding sleeve 76 that slidably mounts a vertical pin 77 carrying the stock engaging and sensing head 78. The pin is retained by a snap ring 79 against the force of a coil spring 81, this arrangement preventing damage to the fingers in case something heavy is set on them.

In order to provide an electrical contactor that is counterbalanced, a threaded horizontal arm 82 extends from block 73 and carries counterweight nuts 83. A contactor arm 84 extends oppositely from block 73 there being a vertical contactor pin 86 mounted at the end of the arm, the end of which normally engages a contactor plate 87 on the angle plate by insulator 88. The counterweights are adjusted so that the contactor normally engages its contactor plate, yet the advancing edge of the stock readily breaks the contact and changes the drive to "creep" at pin 51 and to "stop" at pin 52 by suitable relays, magnetic clutches and brakes well known in the art and not illustrated or claimed.

Figure 9:
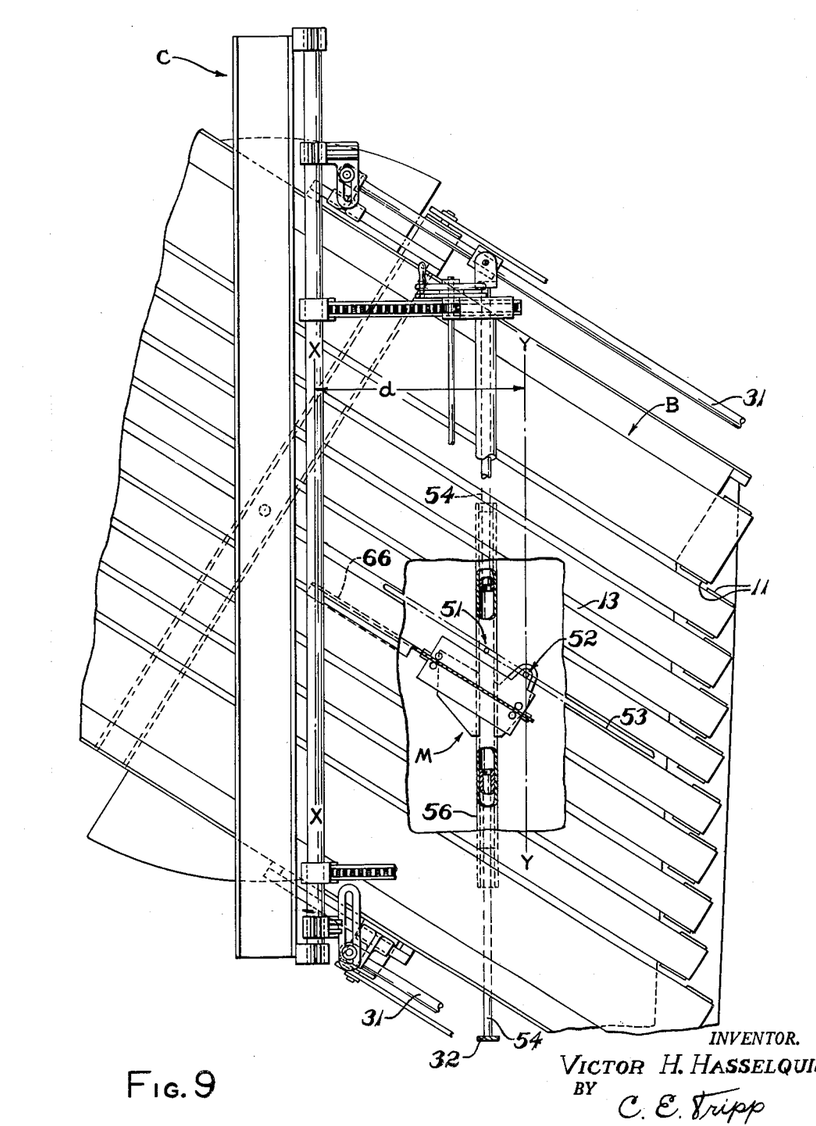
Fig. 9 is a diagram of the position of the parts with a given width and bias angle setting, only a single sensing unit being indicated.
Figure 10:
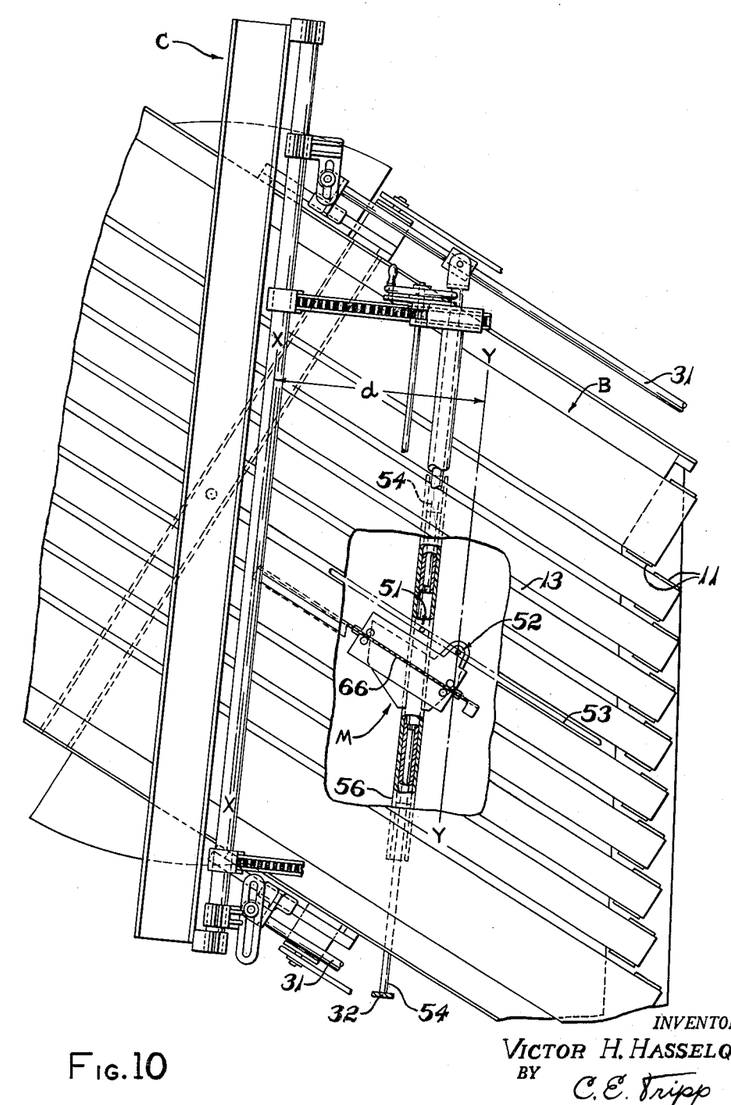
Fig. 10 is a similar diagram of the position of the parts with the same width setting and a larger bias angle setting.

In operation, when the width adjustment is changed by operating crank 24, the depending arms 32 move together in a direction perpendicular to the line x—x, Figs. 9 and 10 to establish the width setting d, which is the distance between lines x—x and line y—y the latter being a line drawn through the coincident pivot pin 62 and the stop finger 52 axes, parallel to the knife bar line x—x. This motion of arms 32 results from the sliding of blocks 30 along guide rails 31. The rods 56 that extend from arms 32 carry the tube 54 and carriage base plate 57 along, but since the swivel plate 59 is guided by track 66 the carriage assembly M can only move in a direction parallel to the slot 53 in the table 13, and this motion is accommodated by the tube 54 sliding on the rods 56, so that the fingers 51 and 52 are always disposed in the slots 53 in the table. In the diagrams of Figs. 9 and 10, only the pivot 62 is shown for clarity, it being understood that stop finger assembly 52 is on the pivot axis as seen in Figs. 6 and 7, and the creep finger assembly 51 is also omitted from the diagrams for clarity.

Figs. 9 and 10 illustrate two different bias angle settings while maintaining the same width setting d. When the bias cutter angle is changed from that shown in Fig. 9 to that shown in Fig. 10, for example, the bias cutter is rotated about its pivot axis 15 to the new position. Slotted plates 38 and 41 slide over pins 40 on the ends of the guide rails to accommodate this motion, and the guide rails themselves slide on their mountings. The base plate 57 of carriage assembly M is moved along the track 66 toward the bias cutter as measured along slot 53. Simultaneously, base plate 57 pivots on swivel plate 59 about pin axis 62 so that the tube 54 remains free to slide on rods 56, the rod at the lower end of Fig. 10 sliding farther into the tube, while the other rod slides farther out of the tube. The result of these compound motions is that the width d of the bias cut fabric is unchanged as the bias cut angle is changed, yet the parts do not bind and nothing need be disconnected and reconnected to permit the adjustment.

Having completed a detailed description of a preferred embodiment of my invention so that those skilled in the art may practice the same, I claim:

1. In a bias cutting apparatus for sheet material which includes a multi-belt conveyor for the material, guide means for mounting a travelling knife and extending across said conveyor and means for adjusting the angle of said guide means relative to the direction of conveyor travel; the improvement comprising a table under said conveyor with a slot therein extending parallel to the direction of conveyor travel between a pair of belts of the conveyor, means for mounting conveyor drive control means on said table comprising a track at the under side of said table parallel to said slot, a swivel plate guided on said track, a base plate pivoted to said swivel plate about an axis that extends through said slot, base plate supporting means extending underneath said table, means slidably mounting said base plate supporting means, and means extending from said adjustable knife guide means and connected to the latter means slidably mounting said base plate supporting means for moving said base plate supporting means in parallelism with said adjustable knife guide means, and a stock engaging finger mounted on said swivel plate at said pivot axis and extending upwardly through said slot in the table.

2. In an apparatus according to claim 1, means mounting said finger for pivotal motion about an axis parallel to said table and perpendicular to said slot.

3. In a bias cutting apparatus for sheet material having a multi-belt conveyor for the material, guide means mounting a travelling knife and extending across said conveyor, and means for adjusting the angle of said knife guide means relative to the direction of conveyor travel; the improvement comprising a table positioned under the material supporting portion of the conveyor with a slot therein extending parallel to the direction of conveyor travel between a pair of belts of said conveyor, means for mounting conveyor drive control means comprising a track at the under side of said conveyor table parallel to said slot, a swivel plate guided on said track, a base plate pivoted to said swivel plate about an axis that extends through said slot, a pair of horizontal arms extending perpendicularly from said knife guide means, a carriage movable along each arm, a cross tube connecting said carriages, rods slidably mounted in said cross tube, guides extending along each side of said conveyor, blocks slidable on said guides, depending arms pivoted on said blocks, rods connected to said depending arms and extending beneath said table, means slidably mounting said base plate on said latter rods, and a stock engaging finger mounted on said swivel plate at said pivot axis and extending upwardly through said slot in the table.

4. Apparatus according to claim 3 and further including means slidably mounting said guides extending along each side of said conveyor, and means adjustably connecting the end of each guide to said knife guide means.

References Cited in the file of this patent

UNITED STATES PATENTS

| | | |
|---|---|---|
| 2,518,042 | Martell | Aug. 8, 1950 |
| 2,681,103 | Hirsch | June 15, 1954 |
| 2,770,459 | Wilson | Nov. 13, 1956 |